(12) United States Patent
Ayachitula et al.

(10) Patent No.: US 8,793,681 B2
(45) Date of Patent: Jul. 29, 2014

(54) DETERMINING BEST PRACTICES FOR APPLYING COMPUTER SOFTWARE PATCHES

(75) Inventors: Naga A. Ayachitula, Elmsford, NY (US); Ying Chen, Beijing (CN); Rajeev Puri, Huntersville, NC (US); Cashchakanithara Venugopal, Naperville, IL (US); Li Jun Xia, Tangshan (CN); Bo Yang, Beijing (CN); Sai Zeng, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 394 days.

(21) Appl. No.: 13/167,772

(22) Filed: Jun. 24, 2011

(65) Prior Publication Data

US 2012/0331455 A1    Dec. 27, 2012

(51) Int. Cl.
*G06F 9/44* (2006.01)

(52) U.S. Cl.
USPC ......................................................... 717/171

(58) Field of Classification Search
USPC ......................................................... 717/171
See application file for complete search history.

(56) References Cited

U.S. PATENT DOCUMENTS

| | | | | |
|---|---|---|---|---|
| 6,763,517 B2 * | 7/2004 | Hines | | 717/124 |
| 6,859,923 B2 * | 2/2005 | Taylor | | 717/172 |
| 6,944,856 B2 * | 9/2005 | Taylor | | 717/171 |
| 7,546,595 B1 * | 6/2009 | Wickham et al. | | 717/168 |
| 7,730,480 B2 | 6/2010 | Isaacson | | |
| 2004/0205709 A1 * | 10/2004 | Hiltgen et al. | | 717/115 |
| 2004/0210653 A1 | 10/2004 | Kanoor et al. | | |
| 2005/0066019 A1 * | 3/2005 | Egan et al. | | 709/223 |
| 2005/0108703 A1 | 5/2005 | Hellier | | |
| 2006/0080656 A1 * | 4/2006 | Cain et al. | | 717/174 |
| 2006/0265630 A1 | 11/2006 | Alberti et al. | | |
| 2008/0065577 A1 * | 3/2008 | Chefalas et al. | | 706/47 |
| 2009/0222811 A1 * | 9/2009 | Faus et al. | | 717/173 |
| 2009/0265690 A1 * | 10/2009 | Naslavsky et al. | | 717/126 |
| 2010/0058313 A1 * | 3/2010 | Hansmann et al. | | 717/168 |
| 2012/0331455 A1 * | 12/2012 | Ayachitula et al. | | 717/171 |

OTHER PUBLICATIONS

Murtha, Amy J.; "The Development of a Configuration Control Tool"; Proceedings. Conference on Software Maintenance, pp. 265-268, IEEE Comput. Soc. Press, Los Alamitos, CA, USA, 1991.
LANDesk Software; "Patch Management"; Copyright 2004 Landesk Software, Ltd. Date document provided Feb. 2, 2011.

(Continued)

*Primary Examiner* — Don Wong
*Assistant Examiner* — Theodore Herbert
(74) *Attorney, Agent, or Firm* — Nicholas L. Cadmus; Arthur Samodovitz

(57) ABSTRACT

In a method for making a recommendation for installing a software patch on a target computer, a computer identifies a first and a second set of computers from a group of computers. Each computer in the first set has hardware and software components, which are identical to each other or differ from each other by less than a predetermined measure. Each computer in the second set has hardware and software components, which are identical to each other or differ from each other by less than a predetermined measure. The computer selects one of the first and the second sets of computers such that the selected set of computers includes a higher number of computers with the software patch already installed.

20 Claims, 7 Drawing Sheets

(56) References Cited

OTHER PUBLICATIONS

LANDesk Software; "Patch Management Software—Learn"; Date accessed Feb. 18, 2011 <http://www.landesk.com/SolutionServices/Solution.aspx?id=7202>.

Ressman, David and Valdes, John; "Use of Cfengine for Automated,Multiplatform Software and Patch Distribution," Proceedings of the Fourteenth Systems Administration Conference (LISA XIV), pp. 207-218, USENIX Assoc, Berkeley, CA, USA, 2000.

* cited by examiner

DETERMINING BEST PRACTICES FOR APPLYING COMPUTER SOFTWARE PATCHES

FIELD OF THE INVENTION

The present invention relates generally to updating computers with software patches, and more specifically to determining best practices for applying computer software patches.

BACKGROUND

Computer viruses, worms, and other types of malicious software programs that attack operating systems and software application executing on computers are an increasing concern for Information Technology (IT) managers. Such malicious software programs are designed to exploit vulnerabilities in operating systems and software applications executing on a computer and can cause downtime for the computer, thus impacting business operations and costing the business money. The business may also incur expenses in repairing the computers and restoring the computers to an operational state, free of the malicious software programs. System administrators are also concerned about software bugs, or flaws, in operating systems and software applications executing on the computers. Software bugs cause software programs to function inconsistently, thus potentially impacting business operations and in turn causing the business to incur extra expenses.

A system administrator may help prevent malicious code from infecting and attacking computer by applying software patches to software applications executing on the computers. A software patch is a software program created by a designer of a software application intended to fix bugs or flaws in the software application. Software patches are also designed to repair and eliminate vulnerabilities in software applications.

Distributing software patches to multiple computers is challenging and time consuming for a system administrator. Specifically, a system administrator may perform a process to install a software patch for a software application on a computer executing a type of operating system. This process, however, may not be effective for installing the software patch on another computer executing another type of operating system, since the other computer may have a different configuration than the first computer. Thus, the system administrator may need to determine and perform a different process to install the software patch on the other computer, taking into account the configuration of the other computer and past experiences in applying software patches on other computers with similar configurations. Software patch management becomes more complex as the number of computers increase, as the number of different types of computer configurations increase, and as the computers become decentralized.

SUMMARY

In a first embodiment of the present invention, there is a system, method and computer program product for making a recommendation for installing a software patch on a target computer. A computer identifies a first and a second set of computers from a group of computers. Each computer in the first set has hardware and software components, which are identical to each other or differ from each other by less than a predetermined measure. Each computer in the second set has hardware and software components, which are identical to each other or differ from each other by less than a predetermined measure. The computer selects one of the first and the second sets of computers, such that the selected set of computers includes a higher number of computers with the software patch already installed. The computer identifies from the selected set of computers a computer having (a) the software patch currently installed and (b) hardware and software components which differ from the hardware and software components of the target computer, less than the hardware and software components of each of the other computers of the selected set of computers differ from the hardware and software components of the target computer. The computer retrieves, from the selected computer, a set of instructions used to install the software patch on the selected computer. Based on the set of instructions, the computer generates a report for installing the software patch on the target computer.

DETAILED DESCRIPTION

Figure 1:
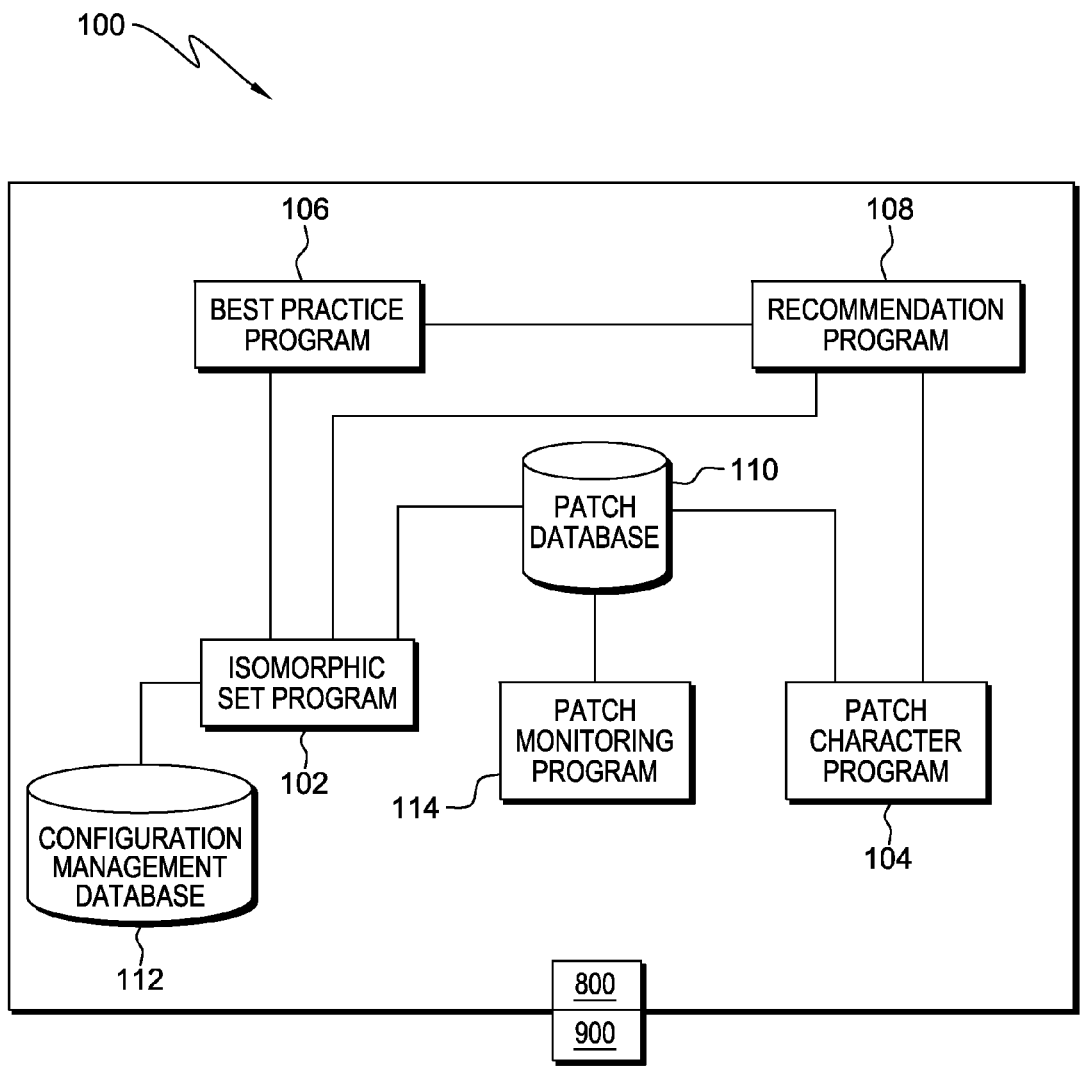
FIG. 1 illustrates a computer system for making a recommendation for installing a software patch on a computer.

The present invention will now be described in detail with reference to the figures. FIG. 1 illustrates a computer system 100 for making a recommendation for installing a software patch on a computer. Computer system 100 leverages information about past patch deployments on similar computers, such as what files changed during the patch installations, how the patch impacted the computers, and what type of feedback or reports have been provided by system administrators performing the patch installations.

Computer system 100 has an isomorphic set identification program 102 for identifying an isomorphic set of computers having the same or similar hardware or software configurations. Computer system 100 has a configuration management database (CMDB) 112 for storing the configurations of the group of computers and providing configuration information to isomorphic set identification program 102. CMDB 112 stores configuration information including, for example, operating system type, amount of memory, applications installed, and other similar types of configurations that may alter an overall architecture of a computer. Thus, an isomorphic set of computers may include, for example, a set of computers executing a Microsoft Windows operating system, with a first Service Pack installed.

It should be understood that a computer may belong to a plurality of isomorphic sets. For example, a second isomorphic set of computers may include computers having 1 GB of memory and a DVD-ROM drive. A computer executing a Microsoft Windows operating system, with a first service pack installed, having 1 GB or memory and a DVD-ROM drive would then be included in both the second isomorphic set and the first described isomorphic set.

Computer system 100 has a best practice program 106 for determining a best practice for installing a software patch on a computer, based on an identified plurality of isomorphic sets of computers. The best practice is a procedure(s) for installing the software patch on the computer that has proven in the past to have a higher than average success rate in installing the same software patch on other similar types of computers.

Computer System 100 has a patch characterization program 104 for identifying patch characters for isomorphic sets of computers and compiling statistics about the patch characters, based on patch attributes stored in patch database 110. A patch character comprises one ore more patch attributes that are shared by all computers in an isomorphic set of computers. Patch database 110 stores the patch attributes or data describing events surrounding patch installations on the group of computers. For example, the patch attributes include information about what files changed on a computer during installation of a patch, what actions were taken during the patch install, and what problems or errors occurred during the patch install, such as the following: a computer requires a reboot after patch installation, a web browser stops working during patch installation, a certain file is replaced after patch installation, or other similar types of information.

Computer system 100 has a recommendation program 108 for making a recommendation for installing a software patch on a computer, based on the patch characters of the isomorphic sets of computers and a best practice that was successful for other, similar computers. For example, a recommendation may include instructions for installing a patch, instructions for monitoring for certain events, and instructions on what actions in to take when certain events occur. For example, the instructions for installing a patch include closing Internet Explorer web browser prior to patch install. The instructions for monitoring for certain events include validating the patch against patches in a current patch profile on the computer to make sure there are no patch conflicts.

Computer system 100 has a patch monitoring program 114 for monitoring the events that take place on a computer during installation of a software patch and for storing the information as patch attributes in patch database 110. For example, patch monitoring program 114 detects changes in files on the computer, actions performed on the computer, and problems encountered on the computer. Patch monitoring program 114 also receives feedback from systems administrators that may be valuable for future installations of the same software patch.

Figure 2:
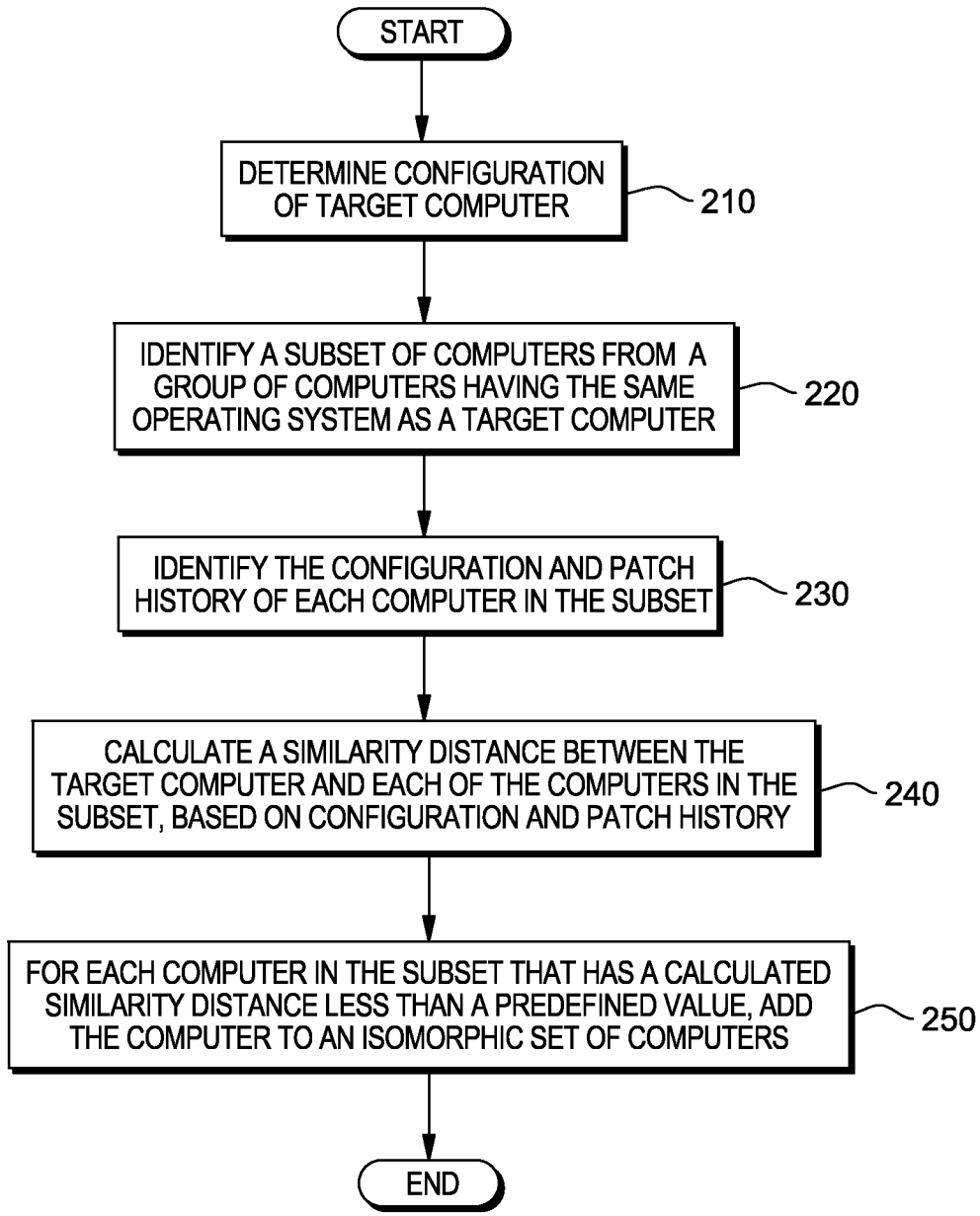
FIG. 2 is a flow chart of an isomorphic set program of FIG. 1 for identifying an isomorphic set of computers from a group of computers based on the configuration of the set of computers.

FIG. 2 illustrates a flow chart of the isomorphic set identification program 102 for identifying an isomorphic set of computers from a group of computers. At step 210, isomorphic set identification program 102 determines a configuration of a target computer by retrieving configuration information from configuration management database 112. The configuration information identifies the operating system, service packs, software patches, and other software installed in the computer, as well as the computer hardware characteristics such as memory space and processor speed.

At step 220, isomorphic set identification program 102 identifies from a group of computers a subset of computers having the same operating system as a computer targeted to receive a software patch. Isomorphic set identification program 102 obtains operating system information about the group or computers and the target computer from configuration management database 112. Narrowing down the group of computers to the subset having the same type of operating system helps ensure that the recommendation generated by recommendation program 108 of computer system 100 will be tailored for the target computer having the same operating system.

At step 230, isomorphic set identification program 102 identifies the configuration and patch history of each computer in the subset of computers. By identifying patch history for the computers in the subset, isomorphic set identification program 102 is able to identify those computers in the subset that already have installed an identical or similar set of software patches to that intended for the target computer. One software patch may supersede another software patch, for example, however the two software patches may be similar even though they are not identical. Patch history of the other computers in the set that do not have the same or similar software patch is also relevant because data regarding an installation of a different software patch on an otherwise similar computer may provide valuable guidance in determining a recommendation for installing a new software patch on the same computer. Isomorphic set identification program 102 retrieves patch history information from configuration patch database 110 for all computers in the subset.

At step 240, isomorphic set identification program 102 calculates a value for the similarity distance between the target computer and each of the computers in the subset, based on the identified configuration and patch history of the computers. A similarity distance defines how dissimilar two computers are. Isomorphic set identification program 102 calculates a similarity distance between the target computer and each other computer in the subset by determining how many features (such as operating system, amount of memory, and processor speed) are different between the two computers. For example, the target computer has a Microsoft Windows operating system, 1 GB of memory, and has a service pack installed. In this example, another computer in the subset has a Microsoft Windows operating system, 1 GB of memory, and a different service pack installed. In the example illustrated, of the three configuration features listed, the two computers have two similar configuration features and one different configuration feature. Thus, the similarity distance between the two computers is one.

At step 250, isomorphic set identification program 102 determines if the calculated similarity distance between a computer in the subset of computers and the target computer is less than a predetermined value, for example, three. For each computer in the subset of computers that isomorphic set identification program 102 determines that the calculated similarity is less than the predetermined value, isomorphic set identification program 102 adds the computer from the subset of computers to an isomorphic set. Thus, a computer having more than three different configuration features (in this example) as compared to a target computer would not be included in the isomorphic set.

Figure 3:
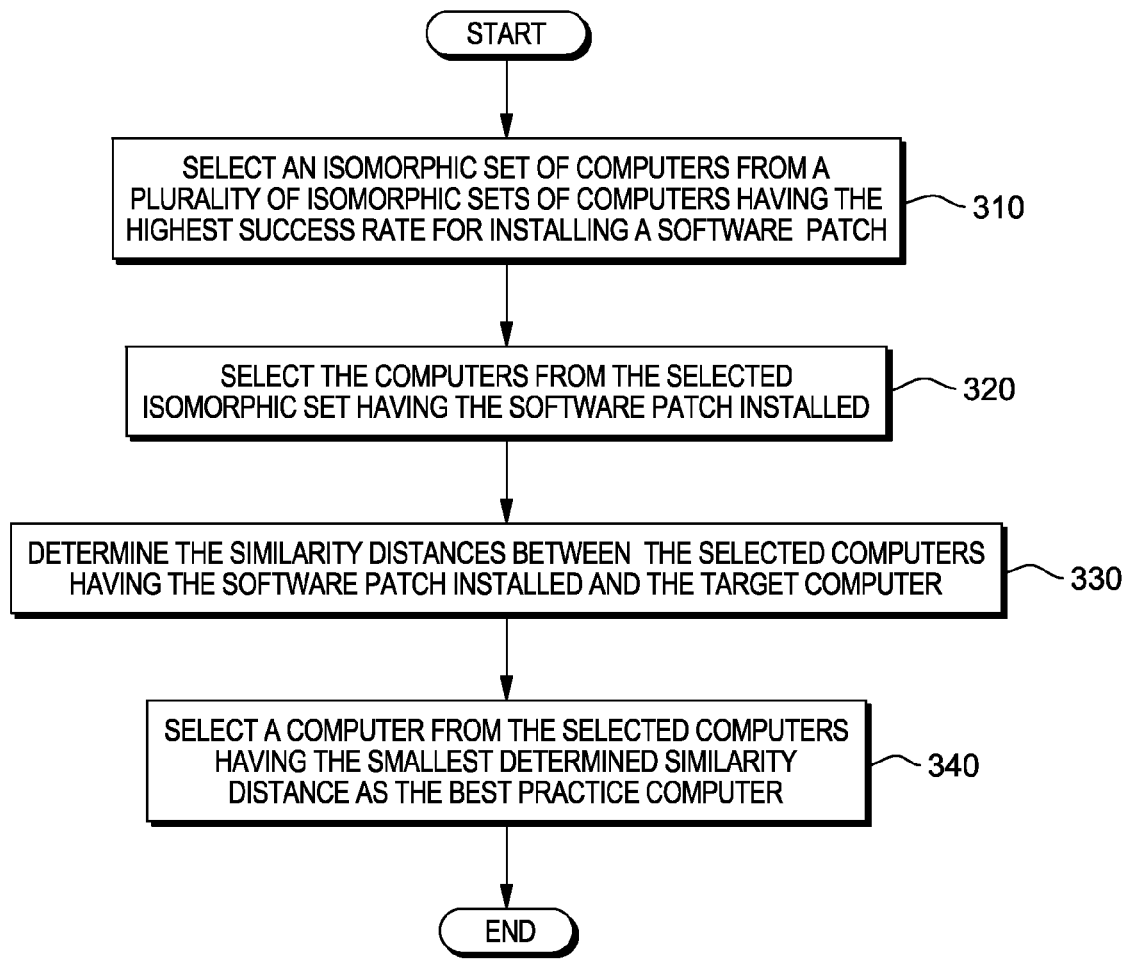
FIG. 3 is a flow chart of a best practice program of FIG. 1 for determining a best practice for installing a specific software patch on a computer.

FIG. 3 illustrates in more detail the steps of the best practice program 106 for determining a best practice for installing a specific software patch on a computer. At step 310, best practice program 106 selects one of the isomorphic set of computers, determined from the algorithm of FIG. 2, which has the highest success rate for installing a specific software patch. Best practice program 106 determines the success rate by counting the number of computers in each isomorphic set that have the specific software patch installed. Best practice program 106 then selects the isomorphic set having the highest number of computers with the particular software patch installed.

At step 320, best practice program 106 identifies the computers having the software patch installed from the selected isomorphic set. At step 330, best practice program 106 calculates the similarity distance, as described with reference to step 240 of FIG. 2, between the identified computers having the software patch installed and a target computer.

At step 340, best practice program 106 selects a computer from the selected computers that has the smallest similarity difference and notes that computer as the best practice computer for installing a particular software patch on the target computer. A best practice computer serves as a model for installing the same software patch on another similar computer. Specifically, a systems administrator can retrieve a process, including a set of instructions, from the best practice computer, that was used to install the software patch on the best practice computer and apply the same process to another computer with a similar configuration and patch history. The process may be retrieved, for example, from the system logs in the best practice computer, or from the external storage such as patch database 110.

In the event that two or more computers have the same similarity difference, best practice program 106 selects either one as the best practice computer.

Figure 4:
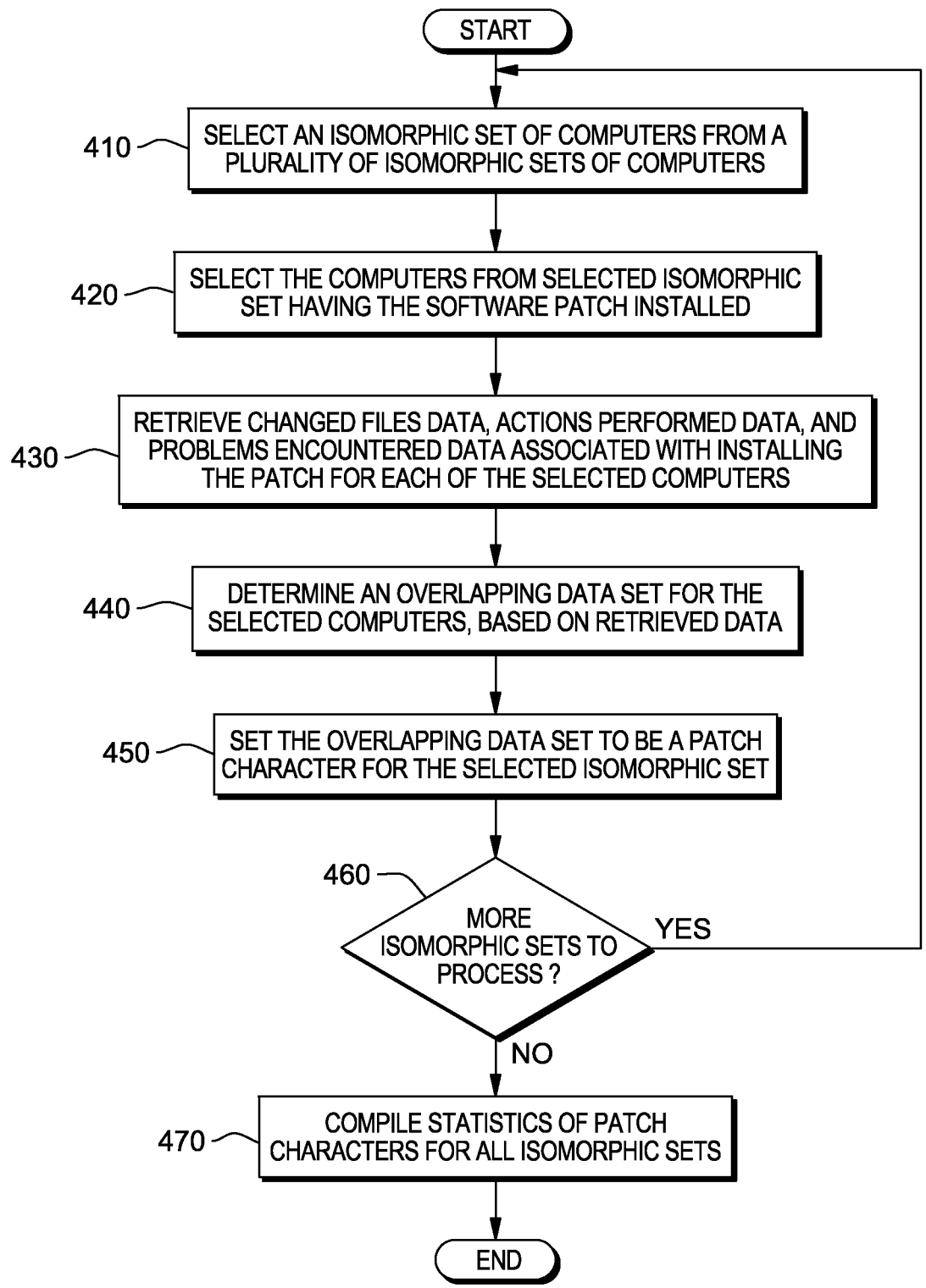
FIG. 4 is a flow chart of a patch character program of FIG. 1 for identifying a patch character for an isometric set of computers.

FIG. 4 illustrates in more detail the steps of the patch characterization program 104 for identifying a patch character for an isomorphic set of computers. At step 410, patch characterization program 104 selects an isomorphic set of computers from a plurality of isomorphic sets of computers. At step 420, patch characterization program 104 selects the computers from the selected isomorphic set that have a same software patch installed which needs to be installed on a target computer.

At step 430, patch characterization program 104 retrieves patch attributes stored in patch database 110 for each of the selected computers. Patch attributes include information about which files changed on a computer after a software patch was installed, what actions were taken during the software patch installation, and what problems occurred during the software patch installation. Action taken may include, for example, closing down a web browser before installation, plugging in a power cord before installation, and other similar types of actions that may prevent the software patch installation from failing. Problems occurred may include both system detected errors and warning events as well as user feedback noting specific problems that occurred during the installation.

At step 440, patch characterization program 104 determines an overlapping set of patch attributes across all of the selected computers. In other words, patch characterization program 104 determines which of the patch attributes occurred for every selected computer. For example, if every one of the selected computers required a web browser to be shut down before proceeding with the software patch installation, then closing the web browser would be part of the overlapping data set of patch attributes.

At step 450, patch characterization program 104 selects the patch attributes of the overlapping data set and determines those patch attributes to be a patch character for the selected isomorphic set of computers. It should be noted that a patch character may include one or more of the patch attributes discussed.

At step 460, patch characterization program 104 determines whether there are more isomorphic sets to process. If patch characterization program 104 determines that there are more isomorphic sets of computers to process (decision 460, yes branch), then patch characterization program 104 repeats the steps discussed for the other isomorphic sets of computers.

When patch characterization program 104 determines that there are not more isomorphic sets of computers to process (decision 460, no branch), then patch characterization program 104 compiles statistics of the patch characters for all of the isomorphic sets of computers, at step 470. Compiling statistics includes counting the number of times a certain patch attribute appears in a patch character. For example, the patch attribute 'web browser stopped working during installation of a software patch' may appear in six patch characters and the patch attribute 'computer reboots after installing the software patch' may appear in three patch characters. These compiled statistics are useful for a systems administrator in determining the best course of action to follow when installing a software patch and will be provided to the system administrator as part of the recommendation generated by recommendation program 108.

Figure 5:
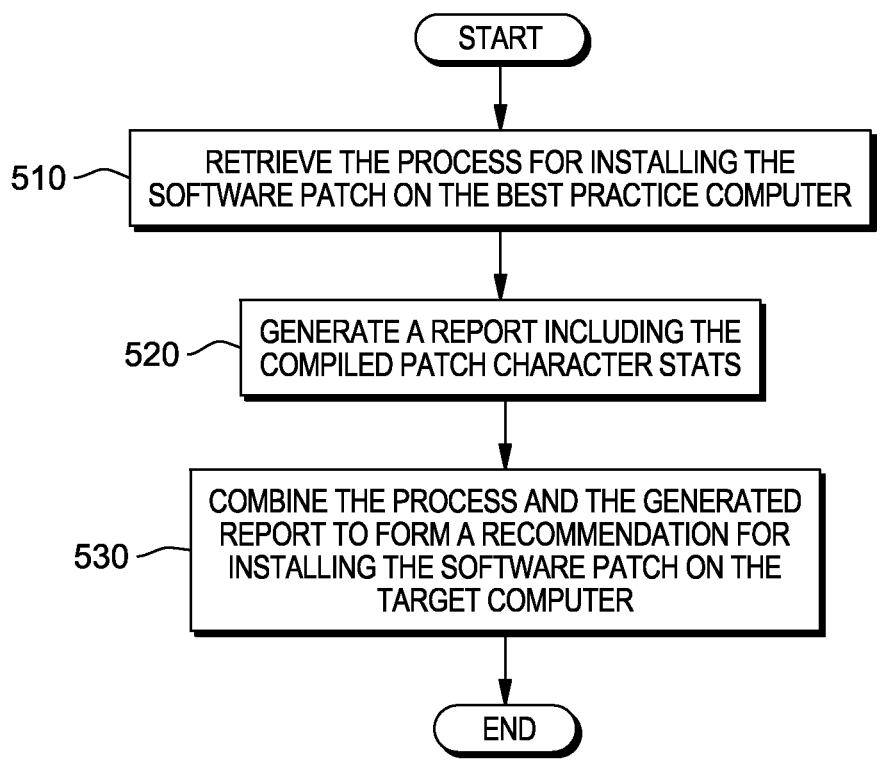
FIG. 5 is a flow chart of a recommendation program of FIG. 1 for forming a recommendation for installing a software patch on a computer.

FIG. 5 illustrates in more detail the steps of the recommendation program 108 for forming a recommendation for installing a software patch on a computer. At step 510, recommendation program 108 determines a process used to install a software patch on a determined best practice computer. The process for installing the software patch can be stored in memory, on the best practice computer. Alternatively, the process can be stored in patch database 110.

At step 520, recommendation program 108 generates a report including compiled patch character statistics. For example, recommendation program 108 may generate a report showing the number of times a certain patch attribute appears in a patch character. The report may also show the total number of computers associated with each patch attribute.

At step 530, recommendation program 108 combines the determined process with the generated patch character statistics report to form a recommendation for installing a software patch on a target computer. The recommendation can be used by a systems administrator to make a decision as to best course of action to take to successfully install a software patch, based on past experiences with similar computers.

Figure 6:
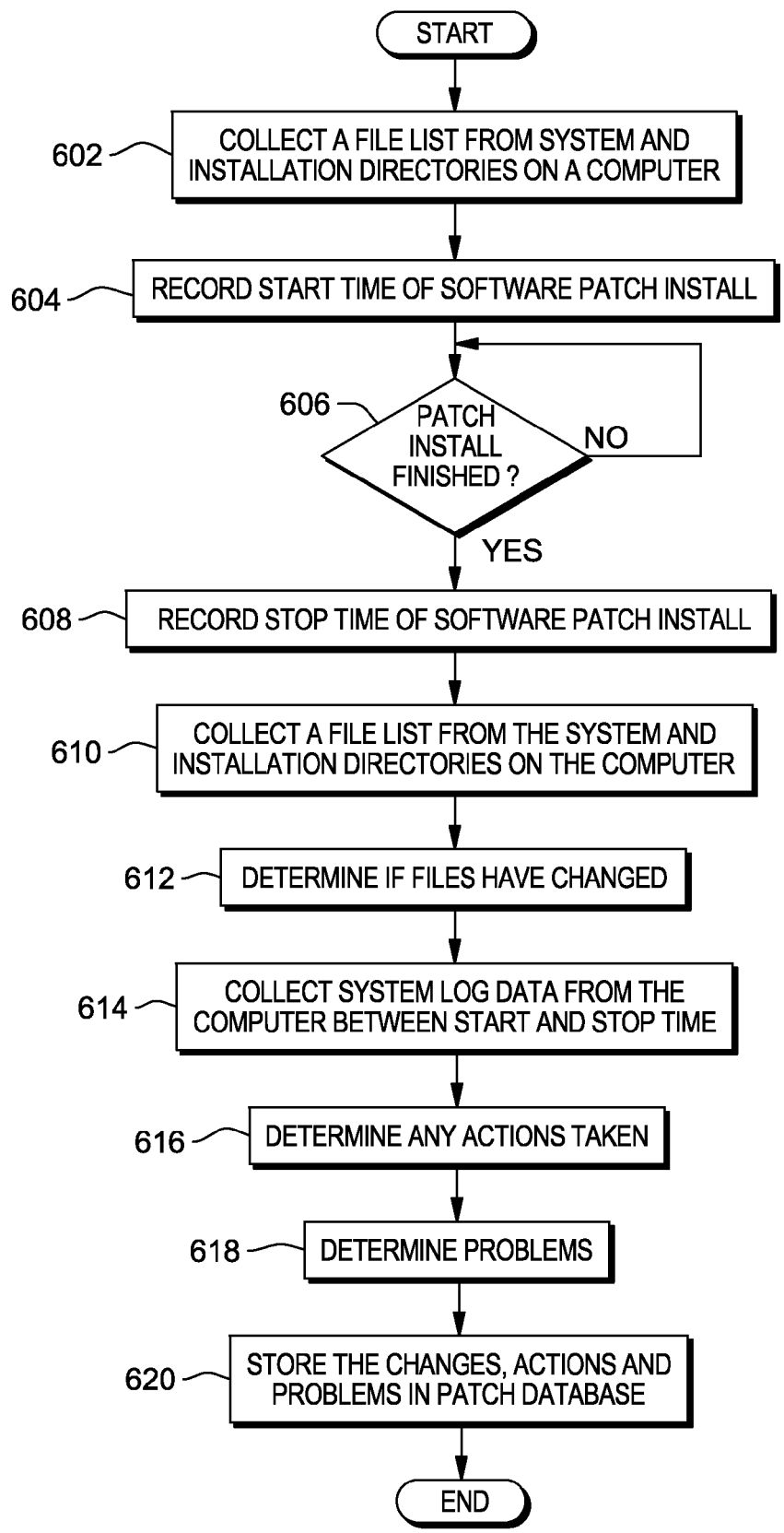
FIG. 6 is a flow chart of a patch monitoring program of FIG. 1 for monitoring the events that take place on a computer during installation of a software patch.

FIG. 6 illustrates in more detail the steps of the patch monitoring program 114 for monitoring the events that take place on a computer during installation of a software patch. At step 602, patch monitoring program 114 collects a list of files from a system folder and an installation folder of a target computer, before the software patch is installed. At step 604, patch monitoring program 114 records a start time when a systems administrator begins to install the software patch.

At step 608, patch monitoring program 114 waits until the systems administrator finishes installing the software patch. When patch monitoring program 114 determines that the software patch installation is complete (decision 606, yes branch), patch monitoring program 114 records a stop time at step 608.

At step 610, patch monitoring program 114 collects a list of files from a system folder and an installation folder of a target computer, after the software patch is installed. At step 612, patch monitoring program 114 determines if any of the files have changed during the installation by comparing the file list collected before the installation with the file list collected after the installation.

At step 614, patch monitoring program 114 collects system log data from the computer that was recorded by the computer between the recorded start time and the recorded stop time. At step 616, patch monitoring program 114 examines the system log data to determine if any actions were taken on the computer during the installation. For example, patch monitoring program 114 determines if a computer was rebooted after during the installation. At step 618, patch monitoring program 114 examines the system log data to determine if any problems occurred during the installation. For example, patch monitoring program 114 determines if a web browser stopped working during the installation.

At step 620, patch monitoring program 114 stores the determined file changes, the determined actions taken, and the determined problems in patch database 110. This information will be later used help a systems administrator determine what course of action to take to successfully install the same software patch on a similar type of computer.

Figure 7:
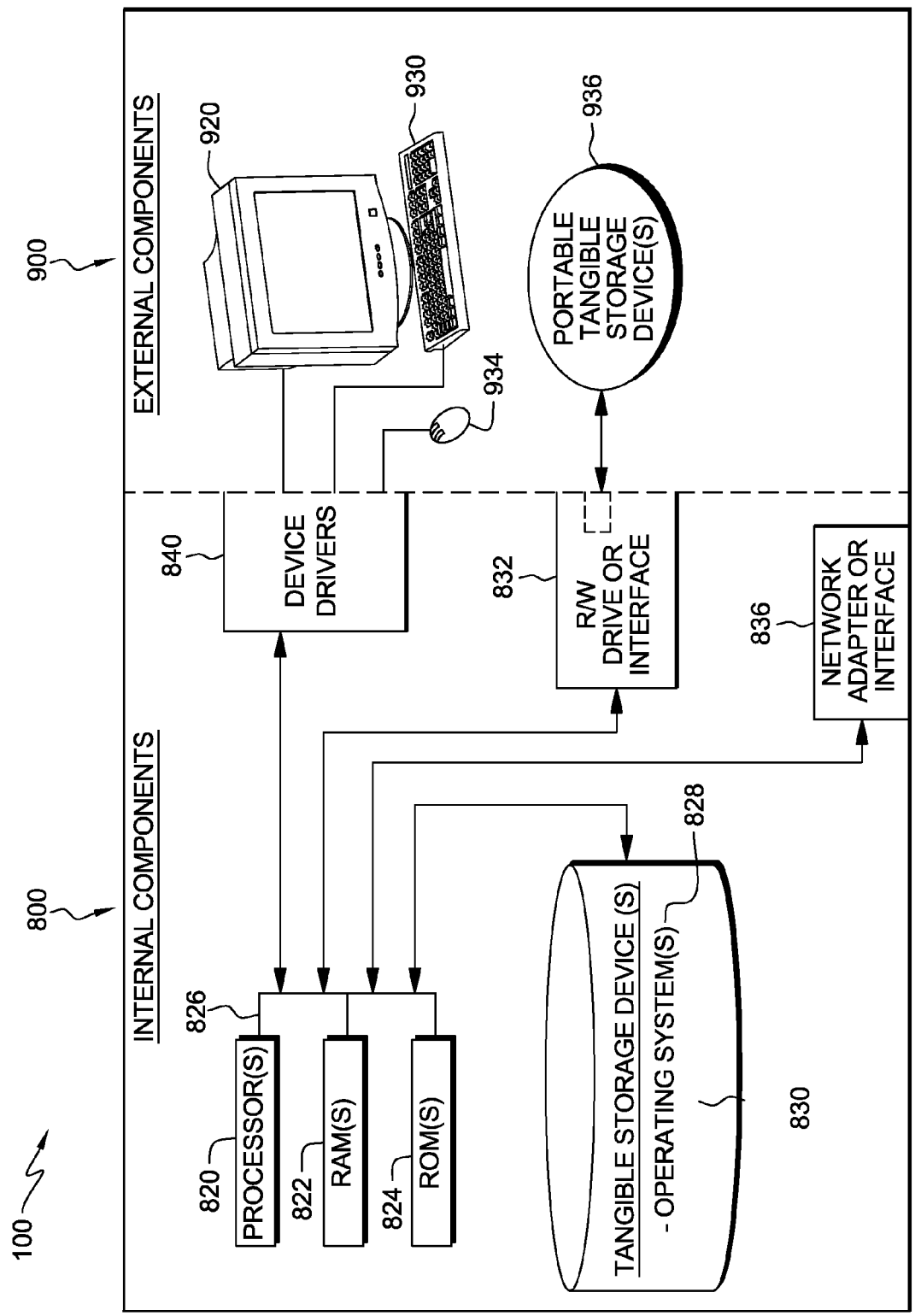
FIG. 7 illustrates hardware and software components of the computer system of FIG. 1.

FIG. 7 illustrates hardware and software components of computer system 100 of FIG. 1. Computer system 100 includes internal components 800 and external components 900. Internal components 800 include one or more processors 820, one or more computer-readable RAMs 822 and one or more computer-readable ROMs 824 on one or more buses 826, and one or more guest operating systems 828 and one or more computer-readable storage devices 830. The one or more operating systems 828, isomorphic set identification program 102, patch characterization program 104, best practice program 106, recommendation program 108, and patch monitoring program 114 are stored on one or more of the computer-readable storage devices 830 for execution by one or more of the processors 820 via one or more of the RAMs 822 (which typically include cache memory). Configuration management database 112 and patch database 110 are also stored on one or more computer-readable storage devices 830. In the embodiment illustrated in FIG. 7 each of the computer-readable storage devices 830 is a magnetic disk storage device of an internal hard drive. Alternatively, each of the computer-readable storage devices 830 is a semiconductor storage device such as ROM 824, EPROM, flash memory or any other computer-readable storage device that can store a computer program and digital information. The term "computer-readable storage device" does not encompass signal propagation media such as a copper cable, optical fiber or wireless transmission media.

Internal components 800 also include a R/W drive or interface 832 to read from and write to one or more portable computer-readable storage devices 936 such as a CD-ROM, DVD, memory stick, magnetic tape, magnetic disk, optical disk or semiconductor storage device. The isomorphic set identification program 102, patch characterization program 104, best practice program 106, recommendation program 108, and patch monitoring program 114 can be stored on one or more of the portable computer-readable storage devices 936, read via R/W drive or interface 832 and loaded into one or more computer-readable storage devices 830.

Internal components 800 also include a network adapter or interface 836 such as a TCP/IP adapter card. The isomorphic set identification program 102, patch characterization program 104, best practice program 106, recommendation program 108, and patch monitoring program 114 can be downloaded to computer system 100 from an external computer via a network (for example, the Internet, a local area network or other, wide area network) and network adapter or interface 836. From the network adapter or interface 836, the isomorphic set identification program 102, patch characterization program 104, best practice program 106, recommendation program 108, and patch monitoring program 114 are loaded into one or more computer-readable storage devices 830. The network may comprise copper wires, optical fibers, wireless transmission, routers, firewalls, switches, gateway computers and/or edge computers.

External components 900 include a computer display monitor 920, a keyboard 930, and a computer mouse 934. Internal components 800 also include device drivers 840 to interface to computer display monitor 920, keyboard 930 and computer mouse 934. The device drivers 840, R/W drive or interface 832 and network adapter or interface 836 comprise hardware and software (stored in one or more computer-readable storage devices 830 and/or one or more computer-readable ROMs 824).

Isomorphic set identification program 102, patch characterization program 104, best practice program 106, recommendation program 108, and patch monitoring program 114 can be written in various programming languages including low-level, high-level, object-oriented or non object-oriented languages. Alternatively, the functions of isomorphic set identification program 102, patch characterization program 104, best practice program 106, recommendation program 108, and patch monitoring program 114 can be implemented in whole or in part by computer circuits and other hardware (not shown).

The description above has been presented for illustration purposes only. It is not intended to be an exhaustive description of the possible embodiments. One of ordinary skill in the art will understand that other combinations and embodiments are possible.

What is claimed is:

1. A method for determining a procedure for installing a software patch on a target computer, the method comprising the steps of:

a computer identifying a first and a second plurality of computers from a group of computers, each computer in the first plurality having hardware and software components which are identical to each other or differ from each other by less than a predetermined number of hardware and/or software components, each computer in the second plurality having hardware and software components which are identical to each other or differ from each other by less than a predetermined number of hardware and/or software components;

the computer selecting one of the first and the second pluralities of computers such that the selected plurality of computers includes a higher number of computers with the software patch already installed than the other plurality of computers;

the computer identifying from the selected plurality of computers a computer having (a) the software patch currently installed and (b) hardware and software components which differ from the hardware and software components of the target computer less than the hardware and software components of any of the other computers of the selected plurality of computers that have the software patch currently installed differ from the hardware and software components of the target computer;

the computer retrieving, from the identified computer, a set of instructions used to install the software patch on the identified computer; and based on the set of instructions, the computer generating a report for installing the software patch on the target computer.

2. The method of claim 1, further comprising the steps of:
the computer selecting a first and second subset of computers of the first and second pluralities of computers, the first and second subset of computers having the software patch installed;
the computer retrieving installation characteristics of the first and second subsets of computers, the installation characteristics comprising data indicative of files altered, actions taken, and errors encountered during installation of the software patch on the computers;
the computer determining the installation characteristics that are shared by each computer in the first or second subset of computers;
the computer counting the number of times an installation characteristic is determined to be shared; and
the computer including in the report, the number of times each installation characteristic has been determined to be shared.

3. The method of claim 1, wherein the computer identifies the first and second plurality of computers by:
obtaining hardware and software configuration data about each computer of the group of computers from a centralized data store; and
comparing the hardware and software configuration data for each computer.

4. The method of claim 1, wherein the computer includes in the report:
instructions for installing the software patch;
instructions for monitoring for a predetermined event; and
instructions for actions to perform in response to the predetermined event occurring.

5. The method of claim 2, wherein the computer retrieves the installation characteristics from a centralized data store.

6. The method of claim 5, wherein the computer monitors a computer while a software patch is installed on the computer to acquire installation characteristics for the computer; and wherein the computer stores the installation characteristics in the centralized data store.

7. The method of claim 6, wherein the computer acquires installation characteristics for the computer by:
comparing a file list of the computer before the software patch is installed with a file list of the computer after the software patch is installed to determine if files have changed; and
retrieving data from a system log of the computer to determine if an action was taken during the installation of the software patch and if an error occurred during the installation of the software patch.

8. A computer system for determining a procedure for installing a software patch on a target computer, the computer system comprising:
one or more processors, one or more computer-readable memories, one or more computer-readable storage devices, and program instructions stored on the one or more storage devices for execution by the one or more processors via the one or more memories, the program instructions comprising:
program instructions to identify a first and a second plurality of computers from a group of computers, each computer in the first plurality having hardware and software components which are identical to each other or differ from each other by less than a predetermined number of hardware and/or software components, each computer in the second plurality having hardware and software components which are identical to each other or differ from each other by less than a predetermined number of hardware and/or software components;
program instructions to select one of the first and the second pluralities of computers such that the selected plurality of computers includes a higher number of computers with the software patch already installed than the other plurality of computers;
program instructions to identify from the selected plurality of computers a computer having (a) the software patch currently installed and (b) hardware and software components which differ from the hardware and software components of the target computer less than the hardware and software components of any of the other computers of the selected plurality of computers that have the software patch currently installed differ from the hardware and software components of the target computer;
program instructions to retrieve, from the identified computer, a set of instructions used to install the software patch on the identified computer; and
program instructions to generate a report for installing the software patch on the target computer, based on the set of instructions.

9. The computer system of claim 8, wherein the program instructions further comprise:
program instructions to select a first and second subset of computers of the first and second pluralities of computers, the first and second subset of computers having the software patch installed;
program instructions to retrieve installation characteristics of the first and second subsets of computers, the installation characteristics comprising data indicative of files altered, actions taken, and errors encountered during installation of the software patch on the computers;
program instructions to determine the installation characteristics that are shared by each computer in the first or second subset of computers;
program instructions to count the number of times an installation characteristic is determined to be shared; and
program instructions to include in the report, the number of times each installation characteristic has been determined to be shared.

10. The computer system of claim 8, wherein the program instructions to identify the first and second plurality of computers:
obtain hardware and software configuration data about each computer of the group of computers from a centralized data store; and
compare the hardware and software configuration data for each computer.

11. The computer system of claim 8, wherein the program instructions to generate the report, include in the report:
instructions for installing the software patch;
instructions for monitoring for a predetermined event; and
instructions for actions to perform in response to the predetermined event occurring.

12. The computer system of claim 9, wherein the program instructions to retrieve installation characteristics retrieve the installation characteristics from a centralized data store.

13. The computer system of claim 12, the program instructions further comprising:
program instructions to monitor a computer while a software patch is installed on the computer to acquire installation characteristics for the computer; and
program instructions to store the installation characteristics in the centralized data store.

14. The computer system of claim 13, wherein the program instructions to monitor a computer while a software patch is installed on the computer to acquire installation characteristics for the computer:
   compare a file list of the computer before the software patch is installed with a file list of the computer after the software patch is installed to determine if files have changed; and
   retrieve data from a system log of the computer to determine if an action was taken during the installation of the software patch and if an error occurred during the installation of the software patch.

15. A computer program product for determining a procedure for installing a software patch on a target computer, the computer program product comprising:
   one or more computer-readable storage devices and program instructions stored on the one or more storage devices, the program instructions comprising:
   program instructions to identify a first and a second plurality of computers from a group of computers, each computer in the first plurality having hardware and software components which are identical to each other or differ from each other by less than a predetermined number of hardware and/or software components, each computer in the second plurality having hardware and software components which are identical to each other or differ from each other by less than a predetermined number of hardware and/or software components;
   program instructions to select one of the first and the second pluralities of computers such that the selected plurality of computers includes a higher number of computers with the software patch already installed than the other plurality of computers;
   program instructions to identify from the selected plurality of computers a computer having (a) the software patch currently installed and (b) hardware and software components which differ from the hardware and software components of the target computer less than the hardware and software components of any of the other computers of the selected plurality of computers that have the software patch currently installed differ from the hardware and software components of the target computer;
   program instructions to retrieve, from the identified computer, a set of instructions used to install the software patch on the identified computer; and
   program instructions to generate a report for installing the software patch on the target computer, based on the set of instructions.

16. The computer program product of claim 15, the program instructions further comprise:
   program instructions to select a first and second subset of computers of the first and second pluralities of computers, the first and second subset of computers having the software patch installed;
   program instructions to retrieve installation characteristics of the first and second subsets of computers, the installation characteristics comprising data indicative of files altered, actions taken, and errors encountered during installation of the software patch on the computers;
   program instructions to determine the installation characteristics that are shared by each computer in the first or second subset of computers;
   program instructions to count the number of times an installation characteristic is determined to be shared; and
   program instructions to include in the report, the number of times each installation characteristic has been determined to be shared.

17. The computer program product of claim 15, wherein the program instructions to identify the first and second plurality of computers:
   obtain hardware and software configuration data about each computer of the group of computers from a centralized data store; and
   compare the hardware and software configuration data for each computer.

18. The computer program product of claim 15, wherein the program instructions to generate the report, include in the report:
   instructions for installing the software patch;
   instructions for monitoring for a predetermined event; and
   instructions for actions to perform in response to the predetermined event occurring.

19. The computer program product of claim 16, wherein the program instructions to retrieve installation characteristics retrieve the installation characteristics from a centralized data store.

20. The computer program product of claim 19, the program instructions further comprising:
   program instructions to monitor a computer while a software patch is installed on the computer to acquire installation characteristics for the computer; and
   program instructions to store the installation characteristics in the centralized data store.

* * * * *